(12) United States Patent
Wasmund (10) Patent No.: US 8,272,033 B2
(45) Date of Patent: Sep. 18, 2012

(54) USER AUTHENTICATION FOR DETECTING AND CONTROLLING FRAUDULENT LOGIN BEHAVIOR

(75) Inventor: Michael Wasmund, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 11/614,931

(22) Filed: Dec. 21, 2006

(65) Prior Publication Data

US 2008/0155651 A1 Jun. 26, 2008

(51) Int. Cl.
*G06F 11/00* (2006.01)
(52) U.S. Cl. .......... 726/2; 726/22; 726/23; 726/24
(58) Field of Classification Search .......... 726/1–4, 726/22–24, 27–29; 713/168–183
See application file for complete search history.

(56) References Cited

U.S. PATENT DOCUMENTS

| | | | | |
|---|---|---|---|---|
| 5,425,102 A | * | 6/1995 | Moy | 713/183 |
| 5,475,839 A | * | 12/1995 | Watson et al. | 713/2 |
| 6,202,158 B1 | * | 3/2001 | Urano et al. | 726/22 |
| 6,910,135 B1 | * | 6/2005 | Grainger | 726/23 |
| 6,993,790 B2 | * | 1/2006 | Godwin et al. | 726/4 |
| 7,861,286 B2 | * | 12/2010 | M'Raihi et al. | 726/5 |
| 8,087,068 B1 | * | 12/2011 | Downey et al. | 726/4 |
| 2006/0037064 A1 | * | 2/2006 | Jeffries et al. | 726/4 |
| 2006/0041756 A1 | * | 2/2006 | Ashok et al. | 713/183 |
| 2006/0130140 A1 | * | 6/2006 | Andreev et al. | 726/23 |

OTHER PUBLICATIONS

Theresa F. Lunt et al., IDES: The Enhanced Prototype—A Real-Time Intrusion-Detection Expert System, SRI-CSL-88-12, Oct. 1988, pp. 1-88, SRI International Menlo Park California USA.

* cited by examiner

*Primary Examiner* — Eleni Shiferaw
*Assistant Examiner* — Phy Anh Vu
(74) *Attorney, Agent, or Firm* — David A. Dagg (57) ABSTRACT

A user authentication system is provided that is suitable for detecting and controlling potentially fraudulent login behavior. A pattern recording module is configured to record login attempts and to detect a pattern of login attempt results. An analyzing module is operatively connected to the pattern recording module and is configured to determine whether or not the pattern of login attempt results has an indicator of at least one abnormal pattern range. An action module is operatively connected to the analyzing module and is configured to perform at least one action, including adjusting a threshold value of the abnormal pattern range for a subsequent pattern of login attempt results if the pattern of login attempt results has an indicator of a predetermined abnormal pattern range.

21 Claims, 4 Drawing Sheets

USER AUTHENTICATION FOR DETECTING AND CONTROLLING FRAUDULENT LOGIN BEHAVIOR

FIELD OF THE INVENTION

This invention relates to a system and to a method for detecting and controlling fraudulent login behavior. The invention also relates to a computer program product for detecting and controlling fraudulent login behavior.

BACKGROUND OF THE INVENTION

Presently, a large amount of day-to-day work is carried out on networks such as the Internet or Local Area Networks (LAN's), which are often connected to the Internet. As a result it has become increasingly necessary for users to login to servers connected to such networks. The threat of server intrusion and data theft are a high priority for many server administrators. As a result, many people need to go through an authentication process before being able to use resources provided by a server. The inconvenience and downtime associated with loss of passwords is well known. However, it is necessary for server administrators to maintain suitable levels of security, particularly as intruders become more sophisticated.

There are currently a wide variety of web-based applications that offer user authentication. Most commonly, present web-based applications check user identification and a secret password. Further developments provide for blocking of user access after a predetermined number of unsuccessful login attempts and/or offering a user who has forgotten the user identification and/or the password some means to recover that information. Those means are often in the form of a question to which the answer has already been provided by a user. These are known as password hints and are in wide use today. A possible problem with this type of system has to do with convenience. It can be annoying to a user if he or she has to answer a question after having provided an incorrect password and/or identification once or twice. On the other hand, allowing the entry of an incorrect password and/or identification too many times without taking protective action can compromise the security of the computer system being accessed.

Another way in which access is controlled is by the use of Reverse Turing Tests or RTTs'. These tests mandate human participation and are thus intended to inhibit access by automated programs or scripts. An example of such a test is to display a distorted code of a number of symbols and to request the user to enter that code. The distorted code is not recognized by an automated program or script. RTT's are particularly useful for defending against computerized attacks. However, they are not capable of distinguishing with any degree of probability that a human user of a computer is an authorized user of that computer. The reason for that is that any human user can make out the distorted code. Such RTT's are thus susceptible to attacks by teams of human users. Also, they do not adjust convenience of use for authentic users that login correctly over a period of time.

International Patent Publication WO 01/90859 A1 discloses an adaptive multi-tier authentication system. The system provides secondary tiers of authentication which are used only when the user attempts a connection from a new environment. User/usage profiles are kept for each user and the user login information is compared to the information from the user/usage profile for the specific user which contains all of the user information that the user used to establish the account and also the usage profile detailing the user's access patterns. The trust level of the current user login location is calculated and the invention determines if any additional questions to the user are required.

United States Patent Publication US 2002/0112184 A1 discloses a system that can be used to monitor for an attempted intrusion of an access system. The system detects an access system event in the access system and determines whether the access system event is of a type that is being monitored. If the access system event is of a type that is being monitored, the system reports information about the access system event. In one implementation, the access system includes identity management and access management functionality. In another embodiment, the access system includes access management functionality and not identity management functionality. The access system event can be an authentication success event, authentication failure event, or other suitable event.

International Patent Publication WO 01/22201 A1 discloses context sensitive dynamic authentication in a cryptographic system. It discloses a system for performing authentication of a first user to a second user that includes the ability for the first user to submit multiple instances of authentication data which are evaluated and then used to generate an overall level of confidence in the claimed identity of the first user. The individual authentication instances are evaluated based upon: the degree of match between the user provided by the first user during the authentication and the data provided by the first user during his enrollment; the inherent reliability of the authentication technique being used; the circumstances surrounding the generation of the authentication data by the first user; and the circumstances surrounding the generation of the enrollment data by the first user. This confidence level is compared with a required trust level which is based at least in part upon the requirements of the second user, and the authentication result is based on this comparison.

A particular problem with the above publications is that they do not provide a means whereby an established authentic user can experience a convenient login process as opposed to a relatively new user or group of users, which could be non-authentic.

SUMMARY OF THE INVENTION

This invention is based on the need to provide a login process that can adjust itself automatically to provide an increased level of security as an authentic user increases his or her number of successful login attempts. The invention achieves this by analyzing successive patterns of login attempts. Successive patterns will change in an expected manner if the user is authentic. The invention exploits this by adjusting a user authentication system to become less tolerant to login failure as one or more pattern characteristics change in a particular manner through the successive patterns.

As a result, if an unauthorized user attempts to make access, the pattern characteristic will change in a different manner, indicating unauthorized access and triggering protective action by the system.

For example, successive patterns will display a reduced number of unsuccessful logins as the authentic user becomes more familiar with the password and/or user name or code. The relevant characteristic in that case will have to do with a probability of login success or failure.

In another example within the scope of the invention, the relevant characteristic could be related to the rate of login attempts. While an authorized user makes login attempts, the rate would be relatively constant with minor fluctuations.

However, sudden increases in the rate of login attempts would indicate possible attempts at unauthorized access. Detection of the increased rate could trigger some form of protective action depending on the level of increase.

Thus, according to the invention, there is provided a user authentication system suitable for detecting and controlling potentially fraudulent login behavior. The system includes a pattern recording module configured to record login attempts and to detect a pattern of login attempt results. An analyzing module is operatively connected to the pattern recording module and is configured to determine whether or not the pattern has an indicator of one or more abnormal pattern ranges. An action module is operatively connected to the analyzing module and is configured to perform one or more actions. These actions include adjusting a threshold value of the indicator of the abnormal pattern ranges for a subsequent pattern if the pattern has an indicator of a predetermined abnormal pattern range.

Preferably, the action module is configured to record an abnormal pattern or suspend operation of a password hint function or revoke login access if the pattern has an indicator of an abnormal pattern range.

The pattern recording module preferably sums at least one result of each login attempt of a predetermined number of login attempts. It preferably also computes a length of time taken to make said predetermined number of login attempts. It preferably generates a calibration factor as a function of said length of time. The pattern recording module also preferably computes a probability value corresponding to a probability of said at least one result by applying the calibration factor to the sum of said at least one result per number of login attempts.

The analyzing module preferably determines if the probability value is an indicator of a first abnormal pattern range by being within a first range of probability values or a second abnormal pattern range by being in a second range of probability values or a third abnormal pattern range by being in a third range of probability values.

The invention extends to a method, in accordance with the configuration of the system described above, of detecting and controlling potentially fraudulent login behavior.

The invention also extends to a computer program product, in accordance with the configuration of the system described above, for detecting and controlling potentially fraudulent login behavior.

One or more preferred embodiments of the invention are now described with reference to the accompanying drawings. The following description is intended only for illustrative purposes and is not intended to limit the scope of the invention in any way.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

One aspect of the invention is a user authentication system suitable for detecting and controlling potentially fraudulent login behavior.

Broadly, the system has a pattern recording module that records login attempts and detects a pattern of login results. The system also has an analyzing module connected to the pattern recording module to determine whether or not the pattern has an indicator of one or more abnormal pattern ranges. An action module is connected to the analyzing module to perform a number of actions. These include adjusting a threshold value for the indicators of abnormal pattern ranges for a subsequent pattern if the pattern has an indicator of a predetermined abnormal pattern range.

Other aspects of the invention are a method and a computer program product for detecting and controlling potentially fraudulent login behavior. The method can be carried out by the system or the computer program product.

The preferred embodiment described below is carried out on a server. A number of workstations are connected to the server via the Internet. However, it will readily be appreciated that other embodiments of the invention can be carried out entirely within a secure workstation or other form of data processing device.

The system, method and computer program product of the invention provides for progressive control of login behavior. For example, if less than a predetermined number of consecutive indicators of abnormal pattern ranges are detected, the system can update thresholds for determining the existence of the indicators of those abnormal pattern ranges. It follows that the system is designed to become less tolerant to login failure as more patterns within abnormal pattern ranges are detected.

This means that the system can automatically configure itself as a particular user becomes more familiar with the login process. As a result, the system remains convenient to use while becoming more and more likely to discover fraudulent login behavior. Furthermore, intrusion attacks are difficult to launch since the system inherently changes in a substantially indeterminable manner.

The remainder of this description below is intended to facilitate an understanding of the invention by describing a preferred embodiment of the invention with reference to the drawings.

Figure 1:
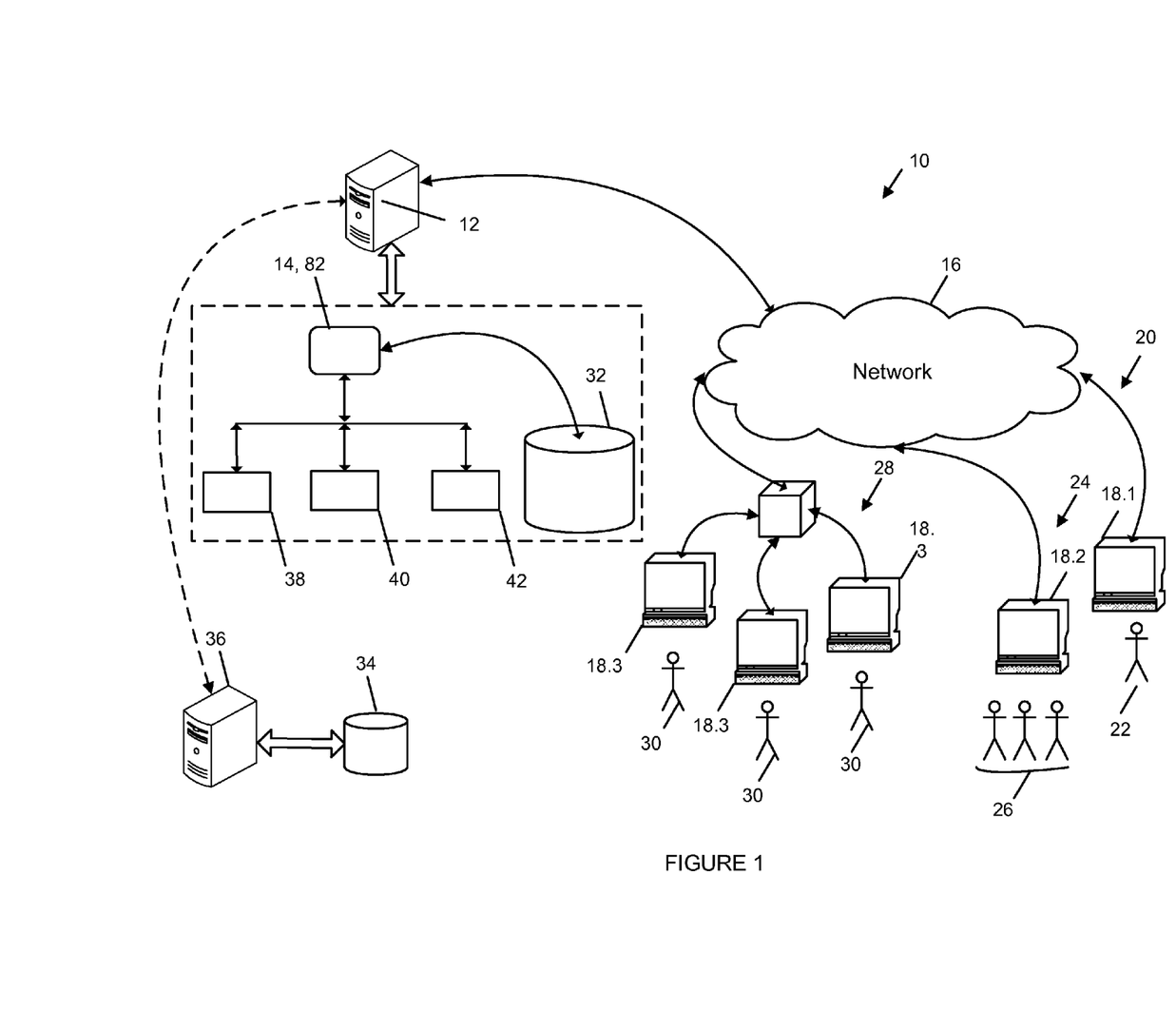
FIG. 1 generally indicates an embodiment, in accordance with the invention, of a user authentication system suitable for detecting and controlling potentially fraudulent login behavior.

In FIG. 1, reference numeral 10 generally indicates an embodiment, in accordance with the invention, of a user authentication system suitable for detecting and controlling potentially fraudulent login behavior.

The system 10 includes an authentication server 12. The authentication server 12 executes an embodiment, in accordance with the invention, of a computer program product or software program, indicated at 14, and described in further detail below.

The system 10 is network-enabled. Thus, the authentication server 12 connects to a network 16. The network 16 can be any network, including a wireless network. In this embodiment, the network 16 is the Internet. However, it will be appreciated that the network 16 could be a Wide Area Network (WAN) or a Local Area Network (LAN).

Workstations 18 connect to the network 16 in a number of different ways. As shown at 20, a single workstation 18.1 provides a single user 22 with connection to the network 16. At 24, a single workstation 18.2 provides a group of users 26 with connection to the network 16. At 28, a number of workstations 18.3 provide respective users 30 with connection to the network 16.

The system 10 authenticates the user 22, or the group 26, or the respective users 30. In particular, the authentication server 12 authenticates use of resources 32, such as applications or databases of the server 12 or resources 34 of a different server 36. The authentication server 12 has a pattern recording module 38 to record login attempts made by users at 20, 24 or 28. The pattern recording module 38 detects a pattern of login attempt results in the form of successful and unsuccessful attempts.

The authentication server 12 has an analyzing module 40 connected to the pattern recording module 38. The analyzing module 40 determines whether or not the pattern has at least one abnormal indicator. An action module 42 is connected to the analyzing module 40 and performs a number of actions, including adjusting a threshold value for the, or each, abnormal indicator for a subsequent pattern if the pattern has a predetermined abnormal indicator.

Figure 2:
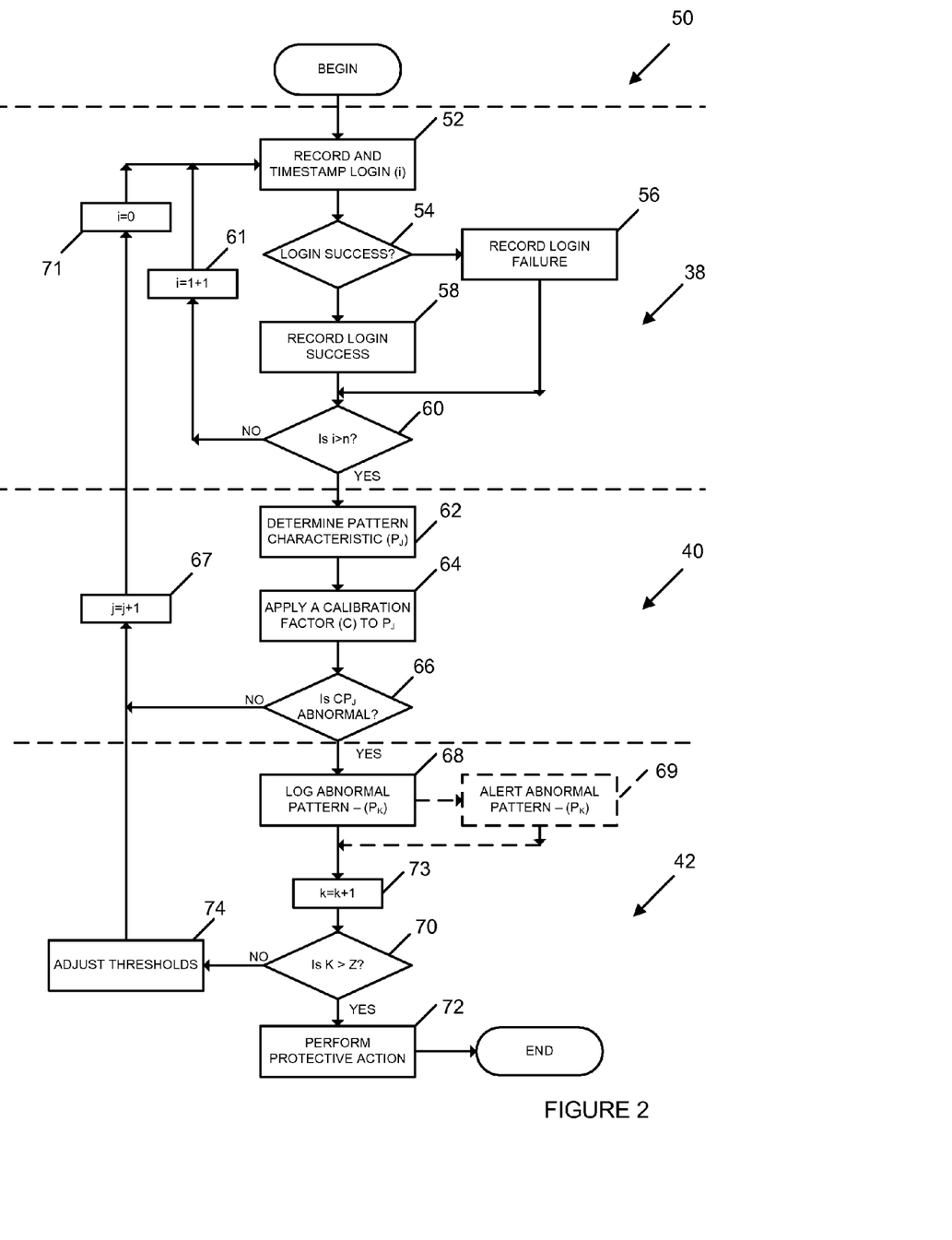
FIG. 2 shows a flowchart indicating operation of an embodiment, in accordance with the invention, of a computer program product suitable for detecting and controlling potentially fraudulent login behavior.

The server 12 executes the software program 14 to invoke the modules 38, 40 and 42. The modules 38, 40 and 42 are shown in FIG. 2, where reference numeral 50 generally indicates a flowchart of the software program 14.

For the, or each, user, the software program 14 records login attempts and starts a login attempt counter (i) at 52. At 54, the program 14 queries whether or not the login has been successful and records failure at 56 and success at 58.

At 60, the program 14 queries whether or not login attempt counter (i) has reached a predetermined value (n). An example of a suitable value for (n) is between 20 and 30. Applicant has found 25 to be a particularly suitable value. Applicant has found that a value which is too low may yield a pattern that is not representative of the login behavior, while a value which is too high may yield a pattern that takes too long to generate, thus inhibiting effective feedback from analysis of the pattern. If the query 60 returns false, login attempt counter (i) is iterated at 61 and control passes back to 52. If the query 60 returns true, a pattern counter (j) is started and control passes to 62 to determine a characteristic of a pattern of successful and unsuccessful login attempts. It is to be appreciated that the characteristic can be the result of a number of different statistical analyses. However, in this embodiment it is preferable that the characteristic is a single number for ease of understanding. As will be seen below, a probability value ($P_j$) of login success or failure can readily be used.

Control then passes to 64 to normalize the characteristic by applying a calibration factor ($C_j$) to the characteristic. It is necessary to normalize the characteristic to account for conditions that could affect the characteristic. For example, the authentication system 10 should be less tolerant to failed login attempts in the case of frequent users compared to failed attempts in the case of infrequent users. Thus, ($C_j$) can be selected to be in the form of a "frequent user levy" and can be related to the time in which the predetermined number of login attempts has been made. This is discussed further below.

At 66, the program 14 queries whether or not the normalized characteristic is an indicator of an abnormal pattern range. The indicator can be configured to indicate whether or not the pattern is in a particular abnormal pattern range. If the query returns false, control passes back to 52 for recording login attempts after iterating (j) at 67, which is a count of patterns, abnormal or not. If the query returns true, the program 14, at 68, logs an abnormal pattern $P_k$ and starts an abnormal pattern counter (k) of abnormal patterns. As shown in dotted lines as a possible additional function, the program 14, at 69, can alert the administrator of the abnormal pattern. This is optional, since administrators can identify an abnormal pattern by observing a log generated by 68.

At 70, the program 14 queries whether Z is above a certain value. This value can be configured to suit different security environments. For example, in a maximum security application (such as government, military, intelligence), Z=0 so that the first abnormal pattern triggers protective action. In a medium security application (such as in a financial application), Z=1 so that the second abnormal pattern triggers protective action. For lower security applications ("everyday"-type applications such as internet accounts and loyalty schemes), Z=2 so that the third abnormal pattern triggers protective action.

If the query returns false, thresholds for the indicator of abnormal pattern ranges are adjusted at 74, k is incremented at 73, and control passes back to 52. If the query returns true, the program 14 performs a protective action at 72. As set out below, the level of protective action can depend on which particular pattern range is represented by the indicator. This can be done by providing further thresholds for the indicator. It will be appreciated that these can also be adjusted at 74.

In all cases where control passes from the queries 66 and 70 to 52, login attempt counter (i) is reset to zero at 71 so that a new pattern can be generated.

As can be seen in FIG. 2, the software program 14 comprises the pattern recording module 38, the analyzing module 40 and the action module 42.

Figure 3:
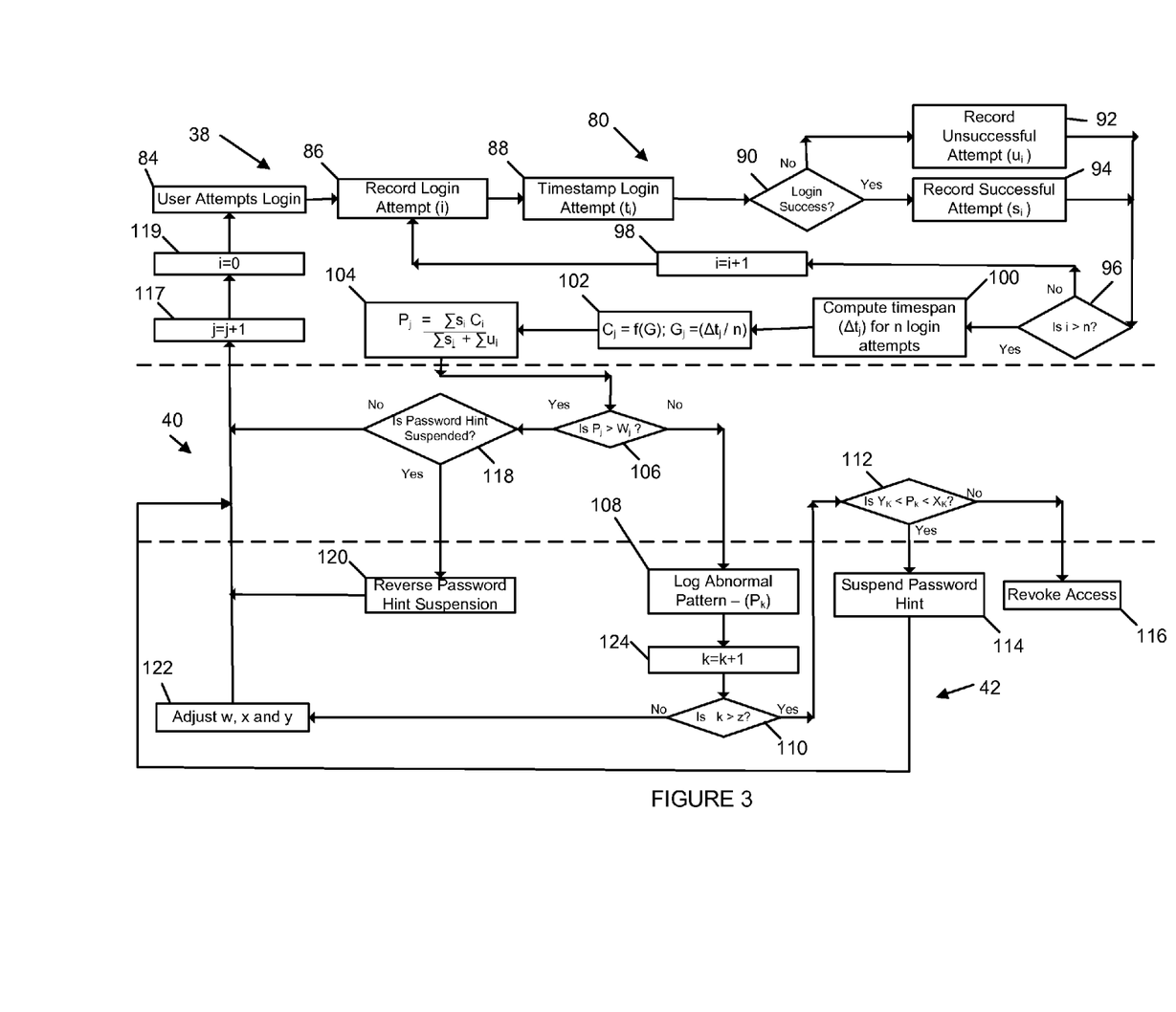
FIG. 3 shows another flowchart indicating operation of an embodiment, in accordance with the invention, of a computer program product suitable for detecting and controlling potentially fraudulent login behavior.

In FIG. 3, reference numeral 80 generally indicates a flowchart of another embodiment, in accordance with the invention, of a computer program product or software program 82 (FIG. 1). The server 12 executes the program 82. As with the program 14, the program 82 also comprises the pattern recording module 38, the analyzing module 40 and the action module 42.

When a user attempts to log into a system controlled by the server 12 or the different server 36 at 84, the program 82 records the login attempt at 86. The program 82 also starts a login attempt counter (i). At 88, the program 82 time stamps the login attempt. At 90, the program 82 queries whether or not the login attempt is successful. If the query returns false, the program records the unsuccessful attempt as ($u_i$) at 92. If the query returns true, the program records the successful attempt as ($s_i$) at 94.

At 96, the program queries whether or not login attempt counter (i) is greater than a predetermined number (n). As set out above, a range of twenty to thirty has been found to be suitable for (n). Twenty-five has been found to be particularly suitable. If the query returns false, the program 82 increments login attempt counter (i) at 98 and records the next login attempt at 86. If the query returns true, the program 82 computes a time span ($\Delta t_j$) and initiates a pattern counter (j) at 100.

Control then passes to 102, where the program 82 computes ($G_j$) where $G_j=(\Delta t_j)/n$, i.e. the login rate. At 102, the program also sets a calibration factor $C_j$ based on $G_j$.

At 104, the program computes a pattern characteristic which has been referred to above. In this embodiment, the pattern characteristic is $P_j$, which is a probability of login success normalized with the calibration factor $C_j$. Thus, without normalization, if $P_j=1$, all the login attempts were successful and if $P_j=0$, none of the login attempts were successful.

Returning to 102, Applicant has determined that if $G_j$ is one day, then a suitable value for $C_j$ is 1.0 within a 10 percent range. If $G_j$ is less than one day, i.e., the user logs in several times a day, then a suitable value for $C_j$ is 0.8 within a 5 percent range. If $G_j$ is greater than a week, a suitable value for $C_j$ is 1.2 within a 15 percent range. If $G_j$ is greater than two weeks, a suitable value for $C_j$ is 1.4 within a 20 percent range.

As a general rule, where G is greater than one day, C can be approximated by the formula: $C=1+(G/35)$.

It follows that $C_j$ is equivalent to a "frequent user levy". The value of $C_j$ is based on the reasoning that the more frequently a user or group of users attempts to login, the less likely it should be that there are login failures if the user or group of users is authentic as opposed to a non-authentic user or group of users.

Thus, at 104, the program 82 computes $P_j$ by summing the successful login attempts ($s_i$) and dividing the results by the total sum of login attempts, for example 25, and multiplying the result by $C_j$.

Control then passes to query 106, where the program 82 queries whether $P_j$ is greater than $W_j$. $W_j$ is selected as a threshold value to detect a slightly abnormal pattern. An example value is 0.9. However, it will be appreciated that other values could be selected depending on the application of the program 82. For example, where higher security is required by sacrificing user-convenience, a higher value such as 0.95 could be selected. Where lower security is required in favor of user-convenience, a lower value such as 0.85 or even lower could be selected.

If the query returns false, the program 82 logs an abnormal pattern $P_k$ at 108. The program 82 increments K at 124.

At 110 the program 82 queries whether k is greater than z. Z represents an unacceptable minimum number of abnormal pattern detections that warrants adjustment to make the program 82 less tolerant of login failure.

If the query returns true, the program 82 queries whether $P_k$ is greater than $Y_k$, but less than $X_k$ at 112 which would indicate a level of abnormality that requires at least initial protective action. If the query returns true, the program 82 suspends operation of a password hint function at 114 to strengthen security and returns control to 84 after incrementing the pattern counter (j) at 117 and setting the login attempt counter (i) to zero at 119. If the query returns false, indicating an even higher level of abnormality, the program 82 revokes access at 116.

Returning to query 106, if it returns true, the program 82, at 118, queries whether or not operation of the password hint function has been suspended subsequent to the generation of a preceding pattern. If the query returns a true, the program 82 reverses suspension of operation of the password hint function at 120 and then passes control to 84 after incrementing the pattern counter (j) and re-setting the login attempt counter (i) to zero. If the query returns a false, control passes to 84 after incrementing the pattern counter (j) and re-setting the login attempt counter (i) to zero.

Returning to query 110, if it returns false, the program 82 adjusts the threshold values, $W_j$, $X_k$ and $Y_k$ at 122. In this embodiment, the threshold values are moved up. For example, the threshold values could be moved up by between 5 and 15 percent and more particularly by 10 percent. The reasoning for this is that for a particular user, while the number of abnormal patterns is under a certain threshold, adjusting the threshold values upwardly would accommodate a login learning curve for the user or group. However, in the event that the user or group was not authentic, such adjustment would increase the likelihood of the query 110 returning true after Z iterations. This is a desirable condition since it is likely then to inhibit unauthorized access.

Figure 4:
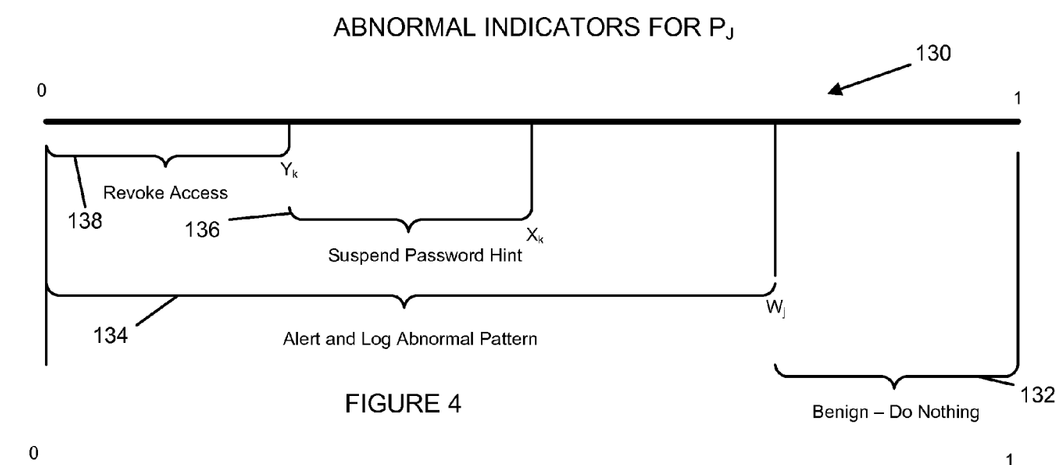
FIG. 4 shows a diagram indicating threshold values for a pattern characteristic determined by an embodiment, in accordance with the invention, of a computer program product, which would indicate whether or not the pattern characteristic is an indicator of an abnormal pattern.

In FIG. 4, reference numeral 130 generally indicates a diagram indicating use of the thresholds $W_j$, $X_k$ and $Y_k$. If $P_j$ is within the zone 132 (greater than $W_j$), then the pattern can be regarded as normal and the action module 42 is not invoked unless it is necessary to reverse the suspension of operation of the password hint function at 120. If Pj is in a range 134 (less than $W_j$), then $P_j$ is an indicator of a first range in which the pattern would considered to be slightly abnormal and the program 82 logs the abnormal pattern $P_k$. If $P_k$ is within a range 136 (between $Y_k$ and $X_k$), then $P_j$ is an indicator of a second range in which the pattern would be considered to be moderately severe requiring at least partial protective action, and the program 82 suspends operation of the password hint function at 114. If Pj is within the zone 138 (less than $Y_k$), then $P_j$ is an indicator of a third range in which the pattern is considered to be very severe requiring full protective action and the program 82 revokes access at 116.

The program 82 is thus able to adjust the thresholds Wj, $X_k$ and $Y_k$ in the event that a pre-determined number of abnormal logins have been detected. It will be appreciated that this permits the program 82 inherently to discriminate between authentic and non-authentic users or groups of users. The reason for this is that the program 82 is able to become incrementally less tolerant to login failure.

It will readily be appreciated that a number of other statistical characteristics could be used to analyze the pattern. A possible way of calculating Pj would be to have it relate to a number of unsuccessful logins as opposed to the number of successful logins as described above. In other words, at 104, instead of summing the successful logins ($s_i$), the unsuccessful logins ($u_i$) could be summed and divided by the total number of logins.

Figure 5:
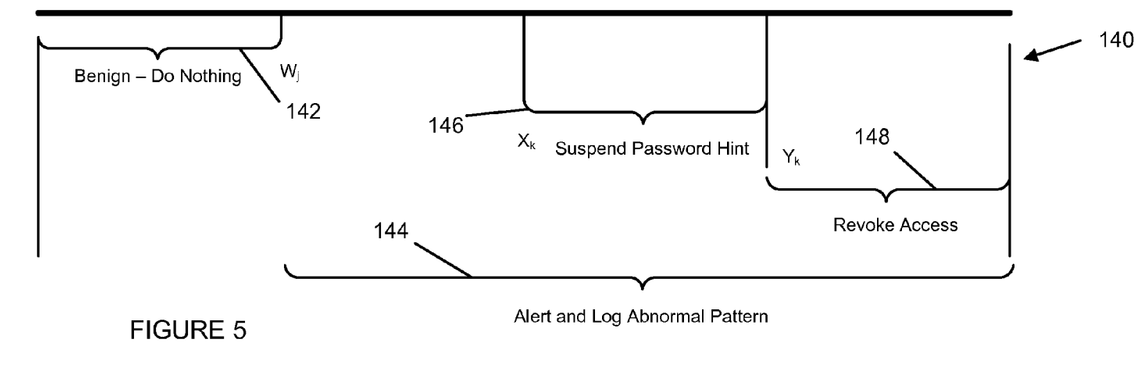
FIG. 5 shows a diagram indicating threshold values for a pattern characteristic determined by a different embodiment, in accordance with the invention, of a computer program product, which would indicate whether or not the pattern characteristic is an indicator of an abnormal pattern.

In that embodiment, the thresholds $W_j$, $X_k$ and $Y_k$ would be lower limit thresholds as opposed to upper limit thresholds. Thus, ranges for determination of indicators of abnormal pattern ranges would be as shown in FIG. 5, generally indicated with reference numeral 140. In particular, if Pj is within a range 142 (less than $W_j$), then the pattern can be regarded as normal and the action module 42 is not invoked unless it is necessary to reverse suspension of operation of the password hint function at 120. If Pj is in a range 144 (greater than $W_j$), then it is an indicator of an abnormal pattern and the program 82 logs the abnormal pattern $P_k$. If $P_k$ is within a range 146 (between $X_k$ and $Y_k$), then it is an indicator of a moderately severe abnormality, and the program 82 suspends operation of the password hint function at 114. If Pj is within a range 148 (greater than $Y_k$), then it is an indicator of a very severe abnormality, and the program 82 revokes access at 116. It will readily be appreciated that the flowchart indicated in FIG. 3 can readily be adjusted to show the operation of this embodiment.

Also in this alternative embodiment, the values for $C_j$ as a function of $G_j$ would be selected so that the lower $G_j$ was, so $C_j$ would be higher accordingly. In contrast to using the sum of login successes, this reflects a "levy" for a decreased likelihood of login failure over a shorter period of time for an authentic user or group of users as opposed to a non-authentic user or group.

In yet a further embodiment, the relevant pattern characteristic could be obtained by taking into account time spacing between login attempts, i.e. the characteristic could be representative of a distribution over time. A graph could be constructed representing the distribution. The system could be configured to suspend operation of a password hint function or revoke access depending on the detection of peaks or clusters of login attempts as compared with regular spacing of login attempts. It will be appreciated that such peaks or clusters would possibly represent attempts at unauthorized login as opposed to more regularly spaced login attempts indicating an authentic user.

It is to be understood that the present invention, in accordance with at least one presently preferred embodiment, includes a user authentication system suitable for detecting and controlling potentially fraudulent login behavior, a method of authenticating a user of a computer system and a computer program product comprising a computer useable medium including a computer readable program for authenticating a user. Together, these elements may be implemented on at least one general-purpose computer running suitable software programs including the preferred embodiment of the computer program product. They may also be implemented on at least one integrated circuit or part of at least one integrated circuit. Thus, it is to be understood that the invention may be implemented in hardware, software, or a combination of both.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

I claim:

1. A user authentication system, comprising:
   at least one computer for detecting and controlling potentially fraudulent login behavior by executing steps including
   recording both successful and unsuccessful login attempts, until a predetermined number of login attempts have been recorded,
   computing a time span over which the predetermined number of login attempts were made,
   detecting, responsive to the recorded login attempts, a pattern of login attempt results, wherein the detecting of the pattern of login attempt results includes generating a calibration factor based on the time span over which the predetermined number of login attempts were made and applying the calibration factor to the pattern of login attempt results,
   determining whether or not the pattern of login in attempt results has an indicator of at least one abnormal pattern range, and
   performing at least one action responsive to determining that the pattern of login attempt results has an indicator of at least one abnormal pattern range, including adjusting a threshold value of the at least one abnormal pattern range for a subsequent pattern of login attempt results.

2. The user authentication system as claimed in claim 1, further comprising:
   the at least one computer for detecting and controlling potentially fraudulent login behavior further performing at least one of the following actions responsive to determining that the pattern of login attempt results has an indicator of at least one abnormal pattern range
   recording an abnormal pattern,
   suspending operation of a password hint function, and
   revoking login access.

3. The user authentication system as claimed in claim 2, further comprising:
   the at least one computer for detecting and controlling potentially fraudulent login behavior further executing the steps of
   summing successful login attempts within the recorded login attempts, and
   computing a probability value, wherein the probability value comprises a probability of login success, by applying the calibration factor to the sum of successful login attempts divided by a total sum of login attempts within the recorded login attempts.

4. The user authentication system as claimed in claim 3, further comprising:
   the at least one computer for detecting and controlling potentially fraudulent login behavior determining if the probability value is an indicator of a first abnormal pattern range by being within a first range of probability values or a second abnormal pattern range by being within a second range of probability values or a third abnormal pattern range by being within a third range of probability values.

5. The user authentication system as claimed in claim 4, further comprising:
   the at least one computer for detecting and controlling potentially fraudulent login behavior further executing the steps of
   recording the abnormal pattern if the probability value is an indicator of the first abnormal pattern range,
   suspending operation of the password hint function if the probability value is an indicator of the second abnormal pattern range,
   revoking access if the probability value is an indicator of the third abnormal pattern range, and
   adjusting first, second and third threshold values for the first, second and third abnormal pattern ranges, respectively, if less than a predetermined number of consecutive probability values are indicators of the first abnormal pattern range.

6. The user authentication system of claim 1, wherein the at least one computer comprises a server.

7. The user authentication system of claim 1, wherein the at least one computer comprises a secure workstation.

8. A method, embodied in at least one computer, of authenticating a user or group of users of a computer system at login, comprising:
   recording, by the at least one computer, both successful and unsuccessful login attempts, until a predetermined number of login attempts have been recorded;
   computing, by the at least one computer, a time span over which the predetermined number of login attempts were made;
   detecting, by the at least one computer responsive to the recorded login attempts, a pattern of login attempt results, wherein the detecting of the pattern of login attempt results includes generating a calibration factor based on the time span over which the predetermined number of login attempts were made and applying the calibration factor to the pattern of login attempt results;
   analyzing, by the at least one computer, the pattern of login attempt results to determine whether or not the pattern of login attempt results has an indicator of at least one abnormal pattern range; and performing, by the at least one computer, responsive to determining that the pattern of login attempt results has an indicator of at least one abnormal pattern range at least one action, including adjusting a threshold value for the at least one abnormal pattern range for a subsequent pattern of login attempt results.

9. The method as claimed in claim 8, in which the performing at least one action further includes performing at least one of the following actions responsive to determining that the pattern of login attempt results has an indicator of at least one abnormal pattern range:

recording, by the at least one computer, an abnormal pattern;

suspending, by the at least one computer, operation of a password hint function; and revoking, by the at least one computer, login access.

10. The method as claimed in claim 9, in which the detecting the pattern of login attempt results further comprises:

summing, by the at least one computer, successful login attempts within the recorded login attempts; and computing, by the at least one computer, a probability value, wherein the probability value comprises a probability of login success, by applying the calibration factor to the sum of successful login attempts divided by a total sum of login attempts within the recorded login attempts.

11. The method as claimed in claim 10, in which the analyzing the pattern of login attempt results includes determining, by the at least one computer, if the probability value is an indicator of a first abnormal pattern range by being within a first range of probability values or an indicator of a second abnormal pattern range by being within a second range of probability values or an indicator of a third abnormal pattern range by being within a third range of probability values.

12. The method as claimed in claim 11 in which the performing at least one action further comprises:

recording the abnormal pattern by the at least one computer if the probability value is an indicator of the first abnormal pattern range;

suspending, by the at least one computer, operation of the password hint function if the probability value is an indicator of the second abnormal pattern range;

revoking access, by the at least one computer, if the probability value is an indicator of the third abnormal pattern range; and adjusting, by the at least one computer, first, second and third threshold values for the first, second and third abnormal pattern ranges, respectively, if less than a predetermined number of consecutive probability values are indicators of the first abnormal pattern range.

13. The method of claim 8, wherein the at least one computer comprises a server.

14. The method of claim 8, wherein the at least one computer comprises a secure workstation.

15. A computer program product stored on a non-transitory computer readable medium, said computer program product including program code for, when executed on at least one computer, causing the at least one computer to authenticate a user or group of users at login, the program code comprising:

program code for, when executed by the at least one computer, causing the at least one computer to record both successful and unsuccessful login attempts, until a predetermined number of login attempts have been recorded;

program code for, when executed by the at least one computer, causing the at least one computer to compute a time span over which the predetermined number of login attempts were made;

program code for, when executed by the at least one computer, causing the at least one computer to detect a pattern of login attempt results, including generating a calibration factor based on the time span over which the predetermined number of login attempts were made and applying the calibration factor to the pattern of login attempt results;

program code for, when executed by the at least one computer, causing the at least one computer to analyze the pattern of login attempt results to determine whether or not the pattern of login attempt results has an indicator of at least one abnormal pattern range; and program code for, when executed by the at least one computer, responsive to determining that the pattern of login attempt results has an indicator of at least one abnormal pattern range, causing the at least one computer to perform at least one action, including adjusting a threshold value of the at least one abnormal pattern range for a subsequent pattern of login attempt results.

16. The computer program product as claimed in claim 15, wherein the program code further comprises program code for, when executed by the at least one computer, responsive to determining that the pattern of login attempt results has an indicator of at least one abnormal pattern range, causing the at least one computer to perform at least one of the following actions:

recording an abnormal pattern;

suspending operation of a password hint function; and revoking login access.

17. The computer program product as claimed in claim 15, wherein the program code further comprises program code for, when executed by the at least one computer, causing the at least one computer to analyze the pattern of login attempt results by determining if a probability value representing a probability of login success is an indicator of a first abnormal pattern range by being within a first range of probability values or an indicator of a second abnormal pattern range by being within a second range of probability values or an indicator of a third abnormal pattern range by being within a third range of probability values.

18. The computer program product as claimed in claim 17, wherein the program code further comprises:

program code for, when executed by the at least one computer, causing the at least computer to record the abnormal pattern if the probability value is an indicator of the first abnormal pattern range;

program code for, when executed by the at least one computer, causing the at least one computer to suspend operation of a password hint function if the probability value is an indicator of the second abnormal pattern range;

program code for, when executed by the at least one computer, causing the at least one computer to revoke access if the probability value is an indicator of the third abnormal pattern range; and program code for, when executed by the at least one computer, causing the at least one computer to adjust first, second and third threshold values for the first, second and third abnormal pattern ranges, respectively, if less than a predetermined number of consecutive probability values are indicators of the first abnormal pattern range.

19. A user authentication system, comprising:
at least one computer for detecting and controlling potentially fraudulent login behavior by executing steps including:
recording both successful and unsuccessful login attempts, until a predetermined number of login attempts have been recorded,
computing a time span over which the predetermined number of login attempts were made,
detecting, responsive to the recorded login attempts, a pattern of login attempt results, wherein the detecting of the pattern of login attempt results includes generating a calibration factor based on the time span over which the predetermined number of login attempts were made and applying the calibration factor to the pattern of login attempt results to determine a normalized characteristic of the pattern of login attempt results,
determining whether or not the normalized characteristic is an indicator of an abnormal pattern range of the pattern of login attempt results, and
performing at least the following actions:
log the pattern of login attempt results if the normalized characteristic is an indicator of an abnormal pattern range, and
adjust a threshold value for the, abnormal pattern range if less than a predetermined number of previously detected patterns of login attempt results have an indicator of an abnormal pattern range.

20. The user authentication system of claim 19, wherein the at least one computer comprises a server.

21. The user authentication system of claim 19, wherein the at least one computer comprises a secure workstation.

* * * * *